United States Patent [19]

Hicks, Jr.

[11] Patent Number: 4,681,399
[45] Date of Patent: Jul. 21, 1987

[54] STRESSED CORE OPTICAL FIBER AND METHOD

[75] Inventor: John W. Hicks, Jr., Northboro, Mass.

[73] Assignee: Polaroid Corporation, Cambridge, Mass.

[21] Appl. No.: 656,534

[22] Filed: Oct. 1, 1984

[51] Int. Cl.⁴ .................................................. G02B 6/16
[52] U.S. Cl. ............................... 350/96.30; 350/96.15; 350/96.29
[58] Field of Search ............... 350/96.29, 96.30, 96.31, 350/96.32, 96.15

[56] References Cited

U.S. PATENT DOCUMENTS

| Re. 28,664 | 12/1975 | Miller | 350/96 |
|---|---|---|---|
| 3,222,615 | 12/1965 | Holly | 372/66 |
| 3,535,017 | 10/1970 | Miller | 350/96 |
| 4,046,537 | 9/1977 | Deserno et al. | 65/2 |
| 4,156,206 | 5/1979 | Comerford et al. | 372/108 |
| 4,179,189 | 12/1979 | Kaminow et al. | 350/96.33 |
| 4,274,854 | 6/1981 | Pleibel et al. | 350/96.30 |
| 4,307,938 | 12/1981 | Dyott | 350/96.30 |
| 4,315,666 | 2/1982 | Hicks, Jr. | 350/96.33 X |
| 4,354,736 | 10/1982 | Maklad et al. | 350/96.32 |
| 4,394,062 | 7/1983 | Schneider et al. | 350/96.33 |
| 4,395,270 | 7/1983 | Blankenship et al. | 65/3.12 |
| 4,415,230 | 11/1983 | Keck | 350/96.30 |
| 4,478,489 | 10/1984 | Blankenship et al. | 350/96.33 X |
| 4,515,436 | 5/1985 | Howard et al. | 350/96.29 |
| 4,561,718 | 12/1985 | Nelson | 350/96.12 |
| 4,575,187 | 3/1986 | Howard et al. | 350/96.30 X |

Primary Examiner—William L. Sikes
Assistant Examiner—Akm E. Ullah
Attorney, Agent, or Firm—Francis J. Caufield

[57] ABSTRACT

A stressed-core rotationally non-symmetric optical fiber includes a longitudinally extending substrate fabricated from an optical energy transmitting material including an embedded tensional stress member. The substrate is provided with stress-altering discontinuities, such as longitudinally extending slots and notches, that are effective to resolve the tensional stress so as to place a longitudinally extending zone within the substrate adjacent the exterior surface thereof under a compressive stress sufficient to raise the index of refraction of the zone to support guided light transmission. In a second embodiment, a longitudinally extending substrate is provided with a notch in which a light energy transmitting core is maintained in axial compression to provide a stress-induced increase in the index of refraction thereof sufficient to support guided light transmission.

28 Claims, 6 Drawing Figures

STRESSED CORE OPTICAL FIBER AND METHOD

BACKGROUND OF THE INVENTION

1. Field of the Invention

The present invention relates to optical waveguides. More particularly, it relates to rotationally non-symmetric optical waveguide fibers well-suited for lateral coupling and to methods for forming such fibers.

2. Prior Art

Optical waveguide fibers typically include an optical energy transmitting core having a selected index of refraction surrounded by a cladding with an index of refraction lower than that of the core. Methods for forming optical fibers typically involve fabricating a multipart preform in which the interior or core part has an index of refraction greater than that of a surrounding outer portion or cylindrical tube. The core preform can be fabricated, for example, by building a doped solid silica cylinder, usually by vapor deposition, to increase the index of refraction above that of undoped silica. Regardless of the manner by which the preform is fabricated, the preform is heated to a temperature greater than its drawing temperature and drawn down in one or more drawing stages to form the resulting optical fiber.

Optical fibers may be coupled to one another either by butt coupling or by lateral coupling. With butt coupling, the ends of the fibers are cut or otherwise formed with an end surface transverse to the longitudinal axis of the fibers and the fibers supported in an end-to-end relationship. Alignment of the butt coupled fibers must be precise to achieve necessary axial core-to-core registration. The alignment problem can be particularly critical with single mode fibers in which core diameters range between 1 and 5 microns. With lateral coupling, portions of the fibers to be joined are placed in overlapping side-by-side relationship with energy transfer effected through evanescent field coupling between the laterally adjacent cores.

The techniques of lateral coupling have been greatly facilitated by the development of optical fibers, such as those disclosed in U.S. Pat. No. 4,315,666 which are rotationally non-symmetric along their length, for example, by placement of the core eccentrically in an otherwise circular fiber. Two such optical fibers can be aligned in a side-by-side relationship and rotated relative to one another to, in effect, "tune" the lateral coupling for optimum optical energy transfer.

In addition to optical fibers constructed as described above, other types of optical fibers have been manufactured by designing core and cladding structures that place the core under a stress relative to the cladding to cause stress-induced birefringence and resulting polarization locking on mutually orthogonal transverse axes. One such stressed-core optical fiber structure and method for fabricating the fiber is disclosed in U.S. Pat. No. 4,354,736 to Maklad et al. As disclosed therein, a circularly symmetric optical energy transmitting core is placed in contact with and supported on two sides within a hollow, elliptical substrate tube or jacket so that the core is at least partially surrounded by an air cladding. The elliptical substrate tube places the core under a compressive stress along one axis to cause a desired stress-induced birefringence. Optical fibers utilizing core and cladding structures that place the core under a stress to achieve birefringent light transmitting characteristics generally position the energy transmitting core within a structure that makes lateral coupling less convenient than with rotationally non-symmetric optical fibers of the type described above and as disclosed in the aforementioned U.S. Pat. No. 4,315,666.

SUMMARY OF THE INVENTION

In accordance with the present invention, a rotationally non-symmetric stressed-core optical fiber waveguide and method are provided in which one or more optical energy transmitting core-like zones or regions are effected by placing such zones or regions of the optical waveguide structure under a compressive stress either to raise the index of refraction of those regions or to develop birefringence. The waveguide structure may be of a single material throughout or it may be fabricated from initially separate preform parts.

In a first embodiment of the present invention, the optical waveguide is a fiber including a generally elongated substrate fabricated from an optical energy transmitting material and having a generally circular overall cross-section. A stressing member is located within the substrate to place the inner portion of the substrate under radial or transverse tension. The substrate is provided with stress altering discontinuities, such as longitudinally extending slots and notches, that function to resolve a portion of the transverse tension in the substrate into compression of longitudinally extending zones located adjacent to the exterior of the substrate, to thereby raise the index of refraction of the zones and form stress-induced light transmitting cores adjacent the exterior of the substrate that are well-suited for lateral coupling.

In a second embodiment, a longitudinally extending axially tensioned substrate is provided with a notch on one side surface. A discrete light transmitting core is inserted into the notch while the substrate is under axial tension to subsequently create an axially compressed core that is sufficiently stressed to raise its index of refraction relative to its surroundings to permit guided light transmission. One method of forming the latter optical waveguide embodiment is to transport the notched substrate in tension over a roller to tension the substrate axially as well as splay open the walls of the notch and then insert the optical energy transmitting core. After the core is inserted, the substrate axially compresses the core to raise its index of refraction to allow guided light transmission.

A principal objective of the present invention is, therefore, the provision of an optical fiber and method therefor by which the fiber has a rotationally nonsymmetric stressed core that is well-suited for lateral coupling. Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENTS

Figure 1:
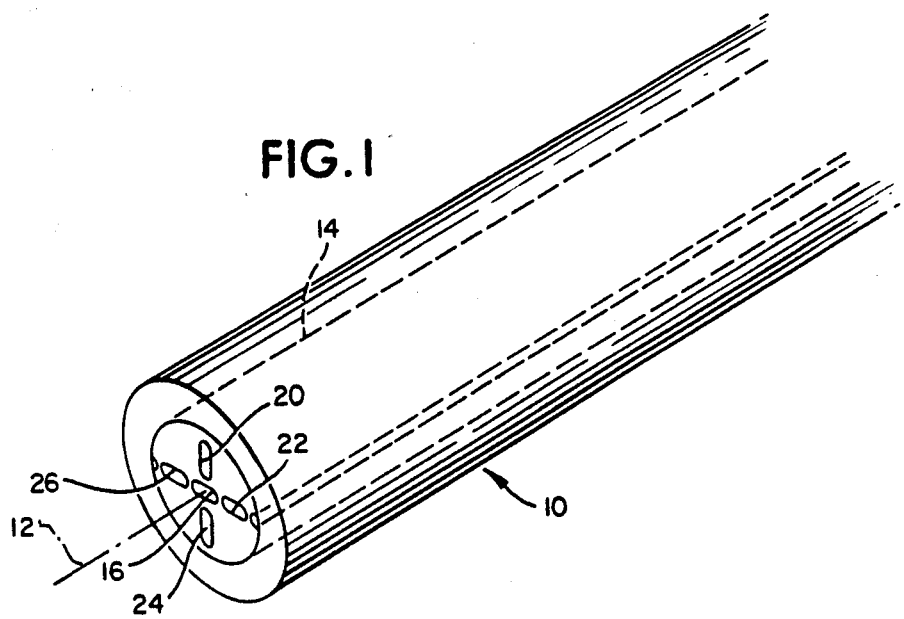
FIG. 1 is a perspective view of an end portion of one embodiment of an optical fiber in accordance with the present invention.

An optical fiber in accordance with the present invention is illustrated in FIG. 1 and designated generally therein by the reference character 10. As shown, the optical fiber 10 is aligned along an axis 12 and includes a substrate 14, a stressing member 16 coaxially embedded within the substrate, and an outer sheath or jacket 18.

Figure 2:
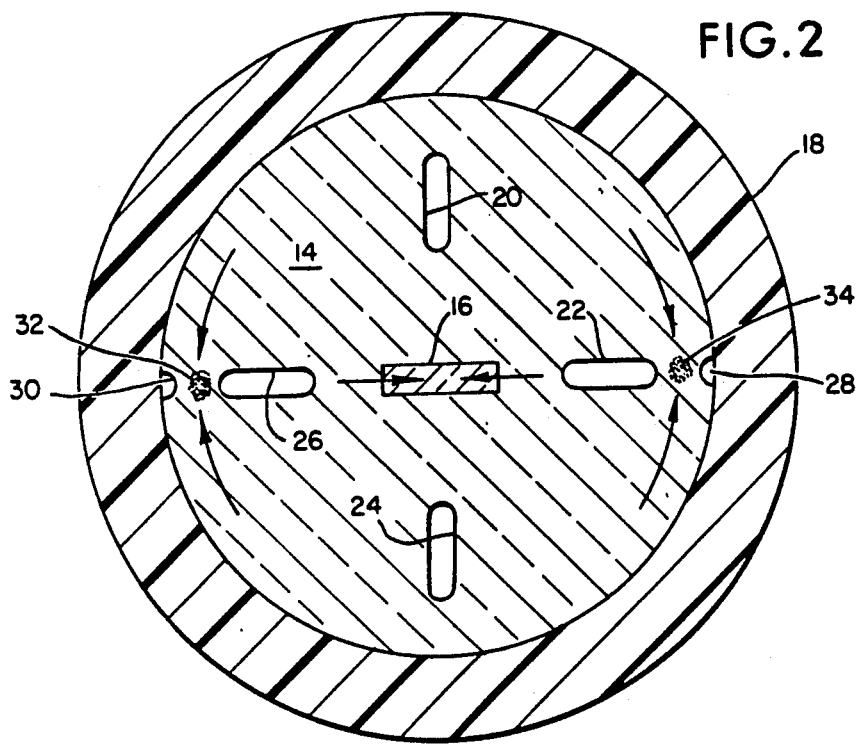
FIG. 2 is a cross-sectional view of the optical fiber illustrated in FIG. 1.

The substrate 14 is formed, as described below, from an optical quality material, such as a pure fused silica or a doped fused silica, that is generally circular when viewed in transverse cross-section, as shown in FIG. 2. The substrate 14 is provided with radially directed, orthogonally aligned discontinuities in the form of slot-like openings 20, 22, 24 and 26, the function of which is described below, that extend longitudinally along the length of the substrate. In addition, the substrate 14 is provided on its exterior surface with diametrically opposed and longitudinally extending notches 28 and 30 that are located along the same plane as the openings 22 and 26, respectively, to define an optical energy transmitting core region or zone 32 between the notch 30 and the slot 26 and another core region or zone 34 between the notch 28 and the slot 22.

The stressing member 16 is fabricated from a material, such as a silica or other glasseous material, that is under tension under normal conditions so as to place the center of the substrate 14 under a radially directed tensional stress. The stressing member 16 is provided with a configuration, such as the rectangular cross-section shown in FIG. 2 that places the center of the substrate 14 under a transversely directed stress primarily in the direction of the length of the rectangle 16 as illustrated by the opposed arrows in FIG 2. The above-described slot-like openings 20, 22, 24 and 26 and notches 28 and 30 function to resolve the internal tensional stress into compression of the core regions 32 and 34. More specifically, the openings 20, 22, 24 and 26 function to alter the strain characteristics of the substrate 14 so that the transverse stress caused by the stressing member 16 is resolved into compression in the area adjoining the outer ends of the openings and the circumference. Finally, the notch 30 and the notch 28 function as stress reliefs in the circumference to aid in focusing or directing the stress to core regions 32 and 34, respectively, as indicated by the curvilinear arrows in FIG. 2, to thereby place the core regions under a circumferentially directed compressive stress. The circumferentially directed stress is effective to raise the index of refraction of the core regions 32 and 34 in a known manner so that guided light transmission can take place within the core regions. The cladding for each of the core regions 32 and 34 is provided by their adjacent slots and notches, which define an air cladding, and the relatively less stressed regions of the substrate 14 adjacent the core regions. The jacket 18, which can be fabricated from a plastic material, is applied about the substrate 14 to protect the core regions 32 and 34 from external perturbations. If desired, the jacket 18 can be a plastic jacket shrink-fitted to the substrate 14 to augment the compressive stress provided by the stressing member 16.

The two optical energy transmitting core regions 32 and 34 are each located eccentrically of the fiber axis adjacent to the peripheral surface of the fiber to define a rotationally non-symmetric fiber well-suited for lateral coupling. More specifically, the optical fiber 10 can be laterally coupled to another fiber of the rotationally non-symmetric type by stripping a portion of the jacket 18 from the substrate 14 in the region of the fiber where coupling is desired. Thereafter, and as described in the above-mentioned U.S. Pat. No. 4,315,666, the core or core regions of the two fibers can be aligned laterally adjacent one another and the fibers rotated to, in effect, tune for optimum coupling.

The optical fiber 10 can be formed by first fabricating a preform having openings for ultimately providing the stress resolving function and a concentrically located stressing member that can be made from, for example, a silica or other glasseous material having a thermal coefficient of expansion greater than that of the surrounding material. The preform is heated to a temperature above its drawing temperature and drawn down in one or more drawing steps to form the optical fiber 10. The material that defines the stressing member 16, having a higher coefficient of thermal expansion, will be under tension under normal operating temperatures to place the center of the substrate 14 under the transversely directed stresses described above.

Figure 3:
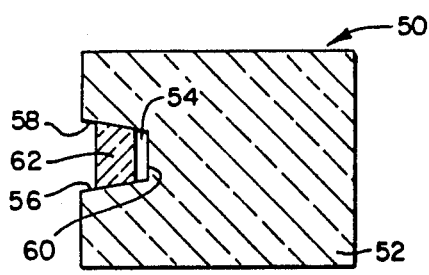
FIG. 3 is a cross-sectional view of a second embodiment of an optical fiber in accordance with the present invention taken along line 3—3 of FIG. 5.
Figure 4:
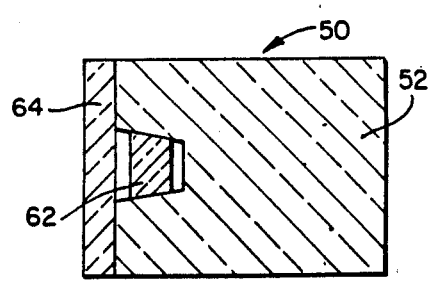
FIG. 4 is a cross-sectional view of the optical fiber illustrated in FIG. 3 with a protective cap affixed thereto and taken along line 4—4 of FIG. 5.

A second embodiment of a rotationally non-symmetric optical fiber having a stressed core is illustrated in FIGS. 3 and 4 and generally designated therein by the reference character 50. As shown in FIG. 3, the optical fiber 50 includes a substrate 52 of generally rectangular cross-section with a notch 54 formed on one side thereof. The notch 54 includes tapered side walls 56 and 58 and a bottom wall 60 to define a notch having a generally trapezoidal cross-section.

An optical energy transmitting filament forming a stressed core 62, having a generally trapezoidal cross-section that complements that of the notch 54 and preferably fabricated from the same material as the substrate 52, is located in the notch. A cap 64 is provided on the notch side of the substrate 52, as shown in FIG. 4, to protect the light transmitting core 62 from external perturbations. Preferably, the core 62 is dimensioned with regard to the notch 54 so that air spaces are provided between the cap 64 and the core and the bottom wall 60 of the notch and the core, the spaces being simply to ensure capping clearance and that the core will not "bottom" in the notch.

The substrate 52 is under axially directed tension under normal operating conditions so that the core 62 is placed under an axially directed compressive stress that is effective to achieve a stress-induced increase or enhancement of the index of refraction of the core 62. Additionally, the complementary trapezoidal cross-sections of the core 62 and the core-receiving notch 54 permit the core to be inserted into the notch with a selected or controllable interference fit that is effective to clamp the core within the notch. Depending upon the depth to which the core 62 is inserted into the notch 54, the interference fit can be sufficient to positionally maintain the core in place or, if desired, additionally place the core under a sufficient transverse compressive stress to augment or complement the axially directed compressive stress and provide some fixed polarization.

The optical fiber 50 of FIGS. 3 and 4 can be laterally coupled to another optical fiber of similar construction by removing a portion of the protective cap 64 along the length of the optical fiber where coupling is desired and aligning the exposed core 62 of the two fibers laterally adjacent one another to achieve lateral coupling through evanescent field coupling.

Figure 5:
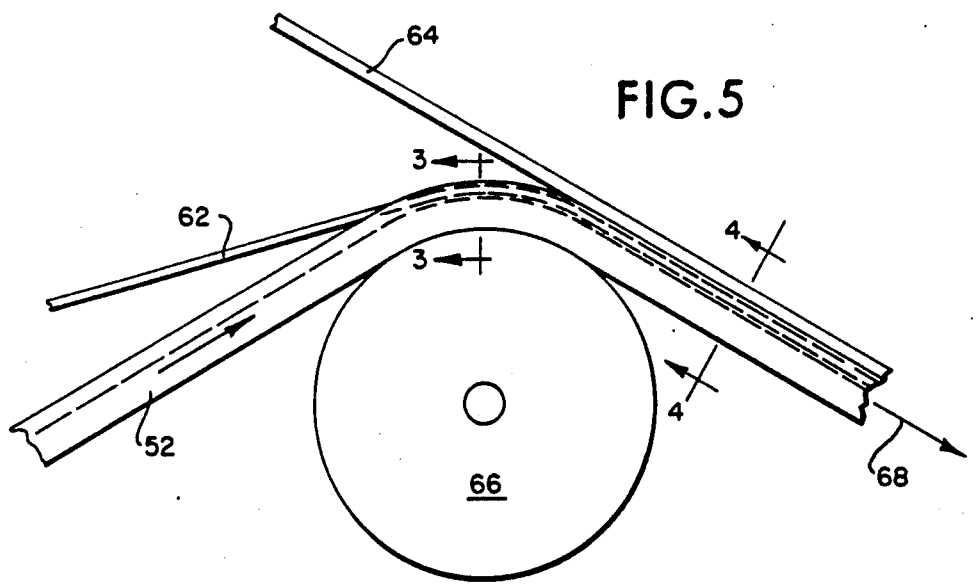
FIG. 5 is a side-elevational view of an apparatus for forming the optical fiber structures illustrated in FIGS. 3 and 4.

The optical fiber 50 of FIGS. 3 and 4 may be assembled utilizing the apparatus of FIG. 5 which includes a rotatably mounted pulley or roller 66. The substrate 52 is entrained about a peripheral portion of the roller 66 in substantial axial tension and simultaneously advanced along its longitudinal axis as generally indicated by the arrow 68. The roller 66 is preferably fabricated from a material that will not mar the substrate 52 surface as the substrate passes over the roller. In addition, it is desirable, as explained below, that the temperature of the substrate 52 be elevated above ambient during core insertion. Of course, the substrate 52 temperature must not be high enough to cause a thermally induced lowering of the elastic limit of the substrate material. By tensioning the substrate 52 as it passes over the roller 66, the side walls 56 and 58 of the notch 54 tend to splay or spread apart somewhat to allow convenient insertion of the optical energy transmitting core 62. After the core 62 is inserted and as the substrate and core assembly advances beyond the roller 66, the side walls 56 and 58 of the notch 54 tend to return to their prior position to thereby place the core 62 under the lateral or transverse stress described above. If desired, the cap 64 may be applied to the fiber during the core insertion procedure as illustrated in FIG. 5. The cap 64 may be affixed to the substrate with a suitable cement. After the core 62 is inserted and the substrate 52 is cooled, the core is placed under axial compression as a result of the release of the axial tension originally applied and the thermal contraction of the substrate from its elevated temperature during core insertion. Thus, release of the applied tension of the substrate 52 places the core 62 under axial compression to raise its index of refraction to allow guided light transmission.

Figure 6:
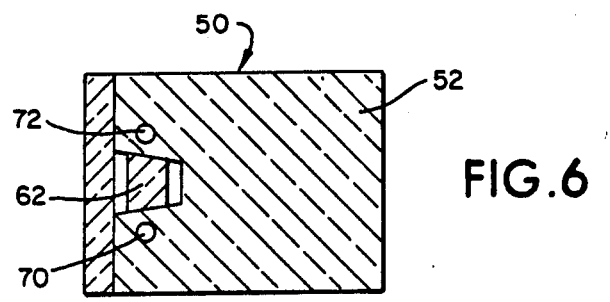
FIG. 6 is a cross-sectional view of a variation of the optical fiber embodiment illustrated in FIG. 4.

As noted previously, depending upon the interference fit between the inserted core 62 and the side walls 56 and 58 of the notch 54, the core can be placed under a transverse compressive stress to induce, if desired, birefringent characteristics. Any applied transverse compressive stress, however, can also raise the index of refraction of the substrate material immediately adjacent the notch walls 56 and 58. Any tendency toward an increase in the index of refraction of the substrate material can be mitigated by providing, as shown in FIG. 6, circular relief bores or openings 70 and 72 on opposite lateral sides of the core 62 and which run longitudinally along the substrate 52. The bores 70 and 72 function to relieve stress in the substrate 52 immediately adjacent the core 62 to effectively lower the index of refraction of the substrate material adjacent the core and provide a boundary or interface between the stress-induced higher index of refraction core and the stress-relieved lower index of refraction substrate material.

Thus, it will be appreciated from the above that as a result of the present invention, a highly effective optical fiber and method therefor is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments, not limiting, and that the true spirit and scope of the present invention will be determined by reference to the appended claims and their legal equivalent.

What is claimed is:

1. An optical waveguide comprising:
   an elongated substrate having a central longitudinal axis and fabricated from an optical energy transmitting material having a nominal index of refraction; and
   means for applying a compressive stress to at least one longitudinally extending cross-sectional zone of said substrate displaced from said central axis to raise the index of refraction of said zone with respect to material surrounding said zone to propagate light energy in said zone, wherein one of said substrate and said means for applying a compressive stress comprises a stressed member longitudinally extending and enclosed within the other of said substrate and said means for applying a compressive stress.

2. The optical waveguide of claim 1, wherein said means for applying a compressive stress subjects said zone to an axially compressive stress.

3. The optical waveguide of claim 1, wherein said means for applying a compressive stress subjects said zone to a transversely directed compressive stress 4. The optical waveguide of claim 1, wherein said means for applying a compressive stress subjects said zone to combined axially and transversely compressive stresses.

5. The optical waveguide of claim 1, wherein said means for applying a compressive stress comprises a transversely tensioned member longitudinally extending within said substrate.

6. The optical waveguide of claim 5, wherein the longitudinal axis of said transversely tensioned member is aligned along said central axis.

7. The optical waveguide of claim 6, wherein said transversely tensioned member has a rectangular cross-section.

8. The optical waveguide of claim 5, wherein said substrate includes discontinuities formed therein for directing a compressive stress into said longitudinally extending cross-sectional zone.

9. The optical waveguide of claim 8, wherein said discontinuities include longitudinally extending slots formed within said substrate for directing a compressive stress into said longitudinally extending cross-sectional zone.

10. An optical fiber for transmitting optical energy, said optical fiber comprising:
    an elongated substrate having a longitudinal axis and fabricated from optical energy transmitting material having a given index of refraction;
    stressing means enclosed within said substrate for applying transverse stress therein; and
    means carried within said substrate for resolving the applied stress therein along at least one longitudinally extending zone of said substrate to cause a stress-induced increase in the index of refraction in said zone with respect to material surrounding said zone sufficient to support guided light transmission.

11. The optical fiber of claim 10, wherein said stress resolving means includes stress relieving openings located between said stressing means and said zone.

12. The optical fiber of claim 11, wherein said stressing means places an inner portion of said substrate under transverse stress along orthogonal axes, the transverse stress along one axis being greater than the other.

13. The optical fiber of claim 12, wherein said stressing means has a rectangular cross-section.

14. The optical fiber of claim 10, wherein said stress resolving means includes stress relieving discontinuities defined by orthogonal, longitudinally extending slots formed within said substrate.

15. The optical fiber of claim 14, wherein said stress relieving discontinuities are further defined by a longitudinally extending notch formed on a surface portion of said substrate, the notch formed in the same plane as one of the longitudinally extending slots to define said longitudinally extending zone therebetween.

16. An optical fiber for transmitting light energy, said optical fiber comprising:
   an elongated substrate having a longitudinal axis and fabricated from optical energy transmitting material, said substrate having a longitudinally extending notch formed along one side thereof, the notch being defined by opposing side walls; and
   a filament of optical energy transmitting material of substantially the same index of refraction as said substrate positioned within said notch between said opposing side walls and fixed therein in axial compression sufficient to raise the index of refraction of said filament to support guided light transmission.

17. The optical fiber of claim 16, wherein the notch is defined by at least two opposing side walls, said filament being positioned between said side walls in an interference fit relationship.

18. The optical fiber of claim 17, wherein said side walls are tapered relative to one another.

19. The optical fiber of claim 18, wherein the notch has a trapezoidal cross-section.

20. The optical fiber of claim 19, wherein said filament has a trapezoidal cross-section that complements the trapezoidal cross-section of the notch.

21. The optical fiber of claim 18 wherein said substrate has a rectangular cross-section, and said notch is formed along one side of said rectangular substrate.

22. The optical fiber of claim 17, wherein said substrate includes longitudinally extending stress-relieving discontinuities adjacent said side walls to prevent a stress-induced increase in the index of refraction in said substrate adjacent said side walls.

23. The optical fiber of claim 16, further comprising means for bridging said notch.

24. A method for fabricating an optical fiber, said method comprising the steps of:
   forming a longitudinally extending substrate of optical energy transmitting material of given index of refraction having a longitudinally extending notch on one side portion thereof, said notch having at least two opposing side walls;
   axially tensioning said substrate;
   inserting a filament of optical energy transmitting material of substantially the same index of refraction as said substrate into said notch in an interfering relationship therewith; and
   releasing the axial tension on said substrate to axially compress the filament sufficiently to effect a stress-induced increase in the index of refraction of the filament.

25. The method of claim 24, wherein said axial tensioning step further comprises establishing an axially directed tension in said substrate in such a manner to cause the opposite side walls of said notch to separate relative to one another while said axial tension is applied.

26. The method of claim 24, wherein said axial tensioning step further comprises the step of heating said substrate to effect a thermal expansion thereof during said insertion.

27. The method of claim 24, further comprising the step of affixing a core-protecting cap over the notch.

28. The method of claim 24 wherein said substrate and said filament are of the same material and identical in index of refraction.

* * * * *